Aug. 13, 1968     I. R. KRAMER ET AL     3,397,168
THERMOPLASTIC EXHIBITING HIGH VISCOSITY AT THEIR
DECOMPOSITION TEMPERATURES

Filed Dec. 17, 1962     3 Sheets-Sheet 1

INVENTORS
ERIC L. STRAUSS
IRVIN R. KRAMER

Stabilized Polyethylene-Phenolic Resin Heat Shield

INVENTORS
ERIC L. STRAUSS
IRVIN R. KRAMER

INVENTORS
ERIC L. STRAUSS
IRVIN R. KRAMER

United States Patent Office 3,397,168
Patented Aug. 13, 1968

3,397,168
THERMOPLASTIC EXHIBITING HIGH VISCOSITY
AT THEIR DECOMPOSITION TEMPERATURES
Irvin R. Kramer and Eric L. Strauss, Baltimore, Md., assignors to Martin-Marietta Corporation, New York, N.Y., a corporation of Maryland
Filed Dec. 17, 1962, Ser. No. 244,980
12 Claims. (Cl. 260—37)

This invention relates to heat shields suitable for use as a thermal protection for bodies subject to severe thermal environments and especially to heat shields composed of or containing ablating materials.

This early history, man—with or without understanding—has used heat insulants in the form of clothing and housing to impede the flow of heat from hotter regions to colder regions. With the advent of the so-called "space age," the problem of protecting structural elements, vehicles, instruments and even man against exposure to excessive, or even dangerous temperatures when passing outwardly into space through the earth's atmosphere or upon returning to earth from outer space has raised the problems of shielding against heat to new dimensions.

For example, bodies which traverse the earth's atmosphere at hypersonic velocities experience temperatures in excess of 3000° F., principally in the stagnation regions and at the boundary layer transition point where flow changes from laminar to turbulent. Rocket nozzles, jet vanes and other parts in contact with a rocket exhaust stream encounter equally extreme thermal and erosive environments. There has developed a need, therefore, for heat shielding materials which possess the low thermal conductivity, high thermal stability and high temperature strength necessary to minimize heat flow to vehicles or structures, while retaining structural capabilities at temperatures in excess of 3000° F.

In order to protect hypersonic vehicles against the destructive effects of high temperatures encountered during the re-entry into the earth's atmosphere, various types of materials and structural configuration have been proposed under the general category of heat shields. Heat shields for satellites, glide re-entry vehicles and hypersonic lifting bodies must be capable of suitably disposing of heat fluxes in the range of 20 to 200 B.t.u./sec.-ft.$^2$ for periods up to 100 minutes. In the event of an aborted mission, even higher heat fluxes are associated with re-entry trajectories of escape capsules; however, these higher fluxes last for considerably shorted periods.

It is generally agreed there is no ideal solution to all such problems. Yet, in many situations, ablating materials possess special advantages in the solution of those problems some of which have been pointed out in Feldman, U.S. Patent No. 3,022,190 and in an article entitled "Growth Potential Defined For Heat Sink, Ablation Shields," by J. S. Butz, Jr., in Aviation Week of Sept. 7, 1959. Also, these, and other publications, point out some but not all, of the problems inherent in the use of ablating heat shields in space technology.

In the design of space systems, the achievement of a desired function with a minimum of weight probably will be a primary criterion. Yet, even here, the theoretical solution of a problem and the actual solution of the problem may not be identical. For instance, tests show that, although theoretically, polyethylene should be a more efficient ablator than Teflon due to its higher hydrogen content, Teflon actually has a higher measured heat of ablation since a considerable amount of polyethylene is swept off the surface as liquid by shear forces under flight conditions. Thus, in actual use, a heat shield may not possess its theoretical thermal efficiency and may be heavier and more costly than theoretically considered necessary in order to achieve a desired amount of shielding.

Likewise, it is undoubtedly true the subliming materials of Feldman will find particular areas of utility but they customarily are relatively dense materials, are impractical from a cost viewpoint for extensive usage and, for the most part, sublime at a relatively lo wtemperature which precludes significant rejection of heat by radiation.

It is an important object of this invention to provide for the most part, sublime at a relatively low temperature resins which function most effectively as ablating materials.

It is another important object of the invention to provide a heat shield which will permit the optimum utilization of the inherent heat shielding properties of thermoplastic resins, especially those which liquify before pyrolyzing, in space technology.

It is a special object of this invention to provide an ablating heat shield containing a thermoplastic resin as an ablating material which is superior to those heretofore known especially when shielding bodies traveling at supersonic speed through the earth's atmosphere.

It is another special object of the invention to provide heat shielding materials having the characteristic set out above.

Other objects and features of the invention will become apparent from the more detailed description taken in connection with the drawings wherein.

Figure 5:
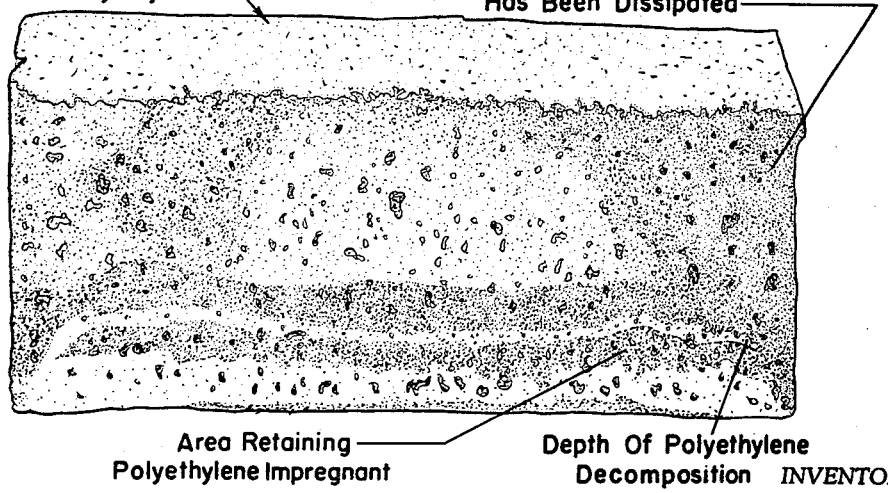
Figure 4:
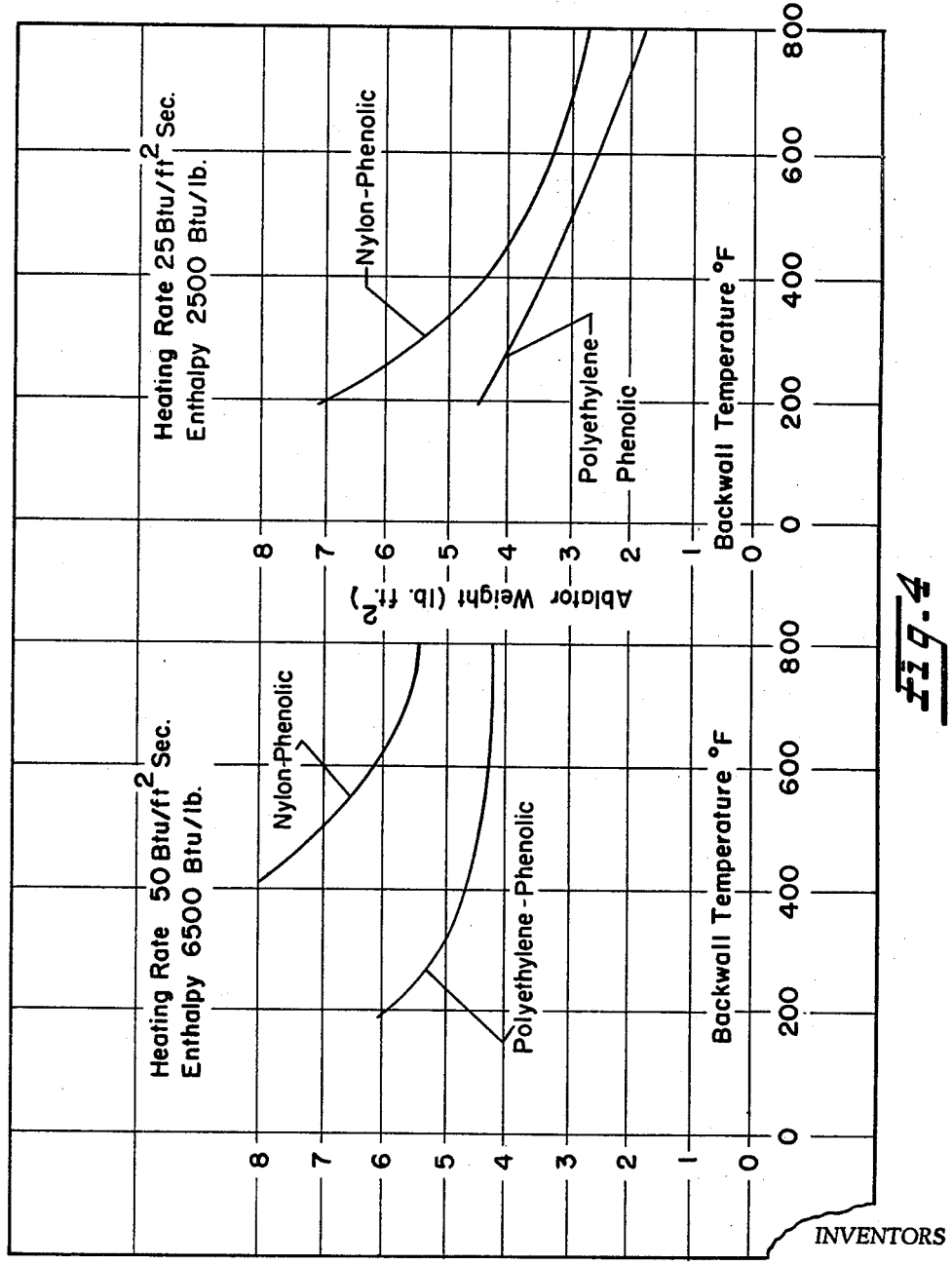

FIGURE 4 graphically illustrates the efficiency of the heat shield illustrated in FIGURE 4, and FIGURE 5 illustrates the effect of ablating temperatures, in simulated re-enry tests, on an open-cell, highly porous zirconia foam impregnated with a polyolefin resin stabilized with silica.

In the study of thermoplastic resins as ablating materials in heat shields for orbital and super-orbital flight and re-entry and the like, it has been found that thermoplastic resins which pass through a liquid phase before pyrolysis have a very favorable pyrolysis temperature, usually abuot 750° to 1250° F., for use in combination with thermoset resins. For example, when such thermoplastic resins are combined with thermoset resins, under flight conditions the thermoset resins char and the outer char-surfaces reach efficient and re-radiation temperatures of 3000 to 4000 F. while the inner char surface temperature is governed by the decomposition temperature of the thermoplastic resin thereby shielding underlying surfaces against excessive heat. Also, it has been discovered that optimum shielding effect is obtained if such resins have a combination of properties such as (1) high specific heat, (2) are highly endothermic during decomposition, and (3) the gaseous pyrolysis products have (a) a high specific heat and (b) possess a low molecular weight. The characteristics are generally present in thermoplastics polymers which have a high hydrogen content. Both for economic and theoretical reasons, the resins which fulfill these requirements most markedly are the substantially completely saturated homogeneous or heterogeneous thermoplastic hydrocarbons resins derived from one or more alpha olefins such as etheylene, propylene, butylene or the like. Yet, under simulated flight conditions, it has been found that a heat shield made up of a phenolic resin and a polyamide resin known as nylon in substantially equal proportions formed a more effective heat shield than a heat shield made up of the same proportions of the phenolic resin and polyethylene resin. This difference must be attributed to the greater fluidity of the polyethylene resin during its liquid phase and the resulting greater attrition due to aerodynamic shear forces.

Now it has been discovered that full advantage of the potential heat shielding capacity of thermoplastic resins which pass through a liquid phase before complete pyrolysis can be obtained by adding certain finely divided amorphous particles in a quantity such that the viscosity of the liquid resin is maintained above a flow level at decomposition temperature. It has been found the addition of 5 to 20% by weight of these particles to such thermoplastic resins will maintain adequate viscosity in heat shields at decomposition temperatures of the resin.

In a preferred practice of the invention, the objectives of the invention are obtained by adding finely divided particles of absorbent silica, i.e., amorphous or colloidal silica to the thermoplastic resins in an amount equalling about 8 to 12½ by weight. The silica functions best when it is as small as practicable so that submicron silica, which is readily available commercially, preferably is used. Submicron colloidal silica and the like has the advantage of being readily wet by the liquid polymer and form flocculation patterns through mutual attraction when dispersed in the liquid thermoplastic resin but do not settle out from a colloidal suspension in the liquified thermoplastic resin. On the other hand, even 12½% of submicron carbon black does not give the desired increase in viscosity in polyethylene resins.

Figure 1:
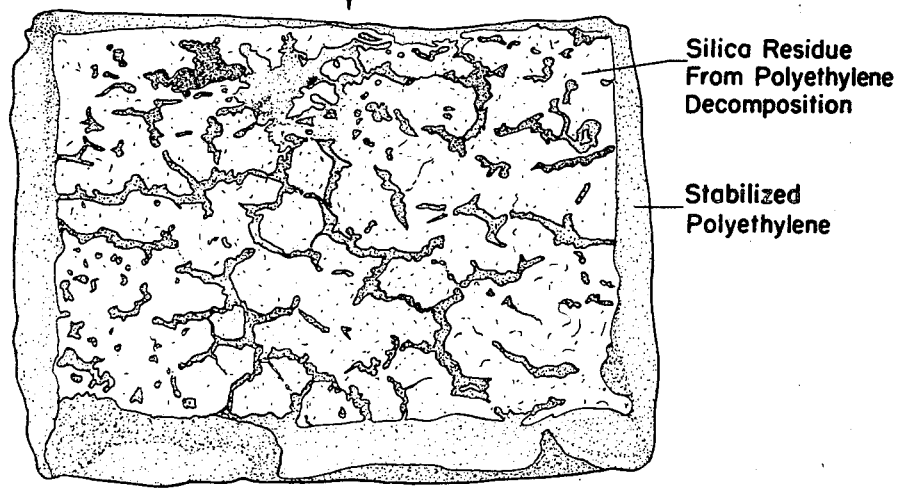
FIGURE 1 illustrates the effect of ablating temperatures on a sample of a heat shield formed from a polyolefin resin stabilized with silica.
Figure 2:
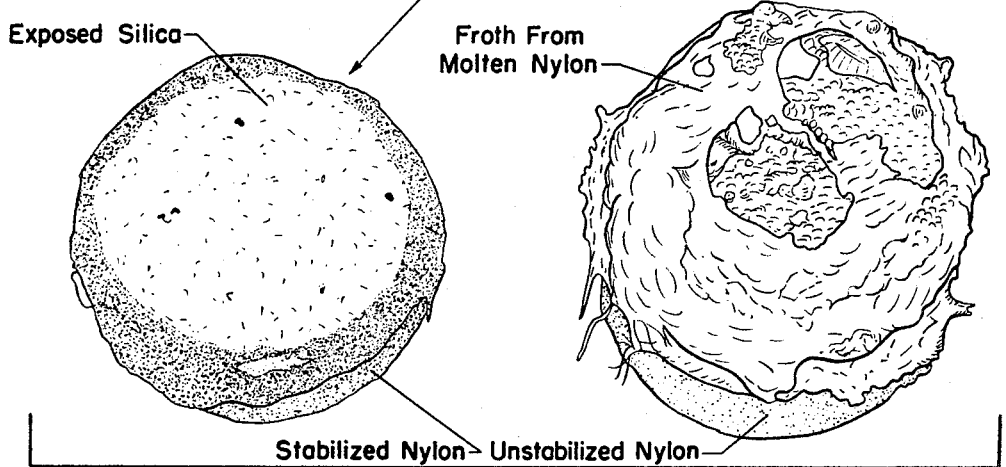
FIGURE 2 illustrates the effect of ablating temperatures on a sample of a heat shield formed from an unstabilized nylon resin and a nylon resin stabilized with silica.

FIGURES 1 and 2 illustrate some of the advantages of adding finely divided silica to polyolefin resins used as ablating materials in shielding against undesirably high temperatures. In preparation for the tests illustrated in FIGURE 1, low molecular weight (2500 to 3000), non-emulsifiable type polyethylene resin known as Epolene N having a density of 0.925 and a viscosity of 2200–2700 cp. (Brookfield) at 250° F., and 15% by weight of a finely divided colloidal silica known as Syloid 244, were formed into a block 2½ in. x 2 in. x ½ inches thick by mixing the Syloid with molten Epolene and pouring the mixture into a mold for hardening. The specimen was exposed for one minute to the flame of an oxy-acetylene torch at a heating rate of 25 B.t.u./ft.² sec. Decomposition of the polyethylene occurred on the surface leaving a residue of silica as illustrated in FIGURE I. No run-off of liquid polyethylene occurred. On the other hand when a like block of Epolene-N without silica stabilization was heated in the same way, it liquified to a fluid which had the viscosity of oil and much of it flowed out of the zone of the oxy-acetylene flame before it was pyrolyzed.

FIGURE 2 illustrates the effects on liquid egression of Nylon 66 when molded with and without silica into cylindrical test pieces. The left hand sample was molded with 10% by weight of Syloid colloidal silica, mentioned above, by blending the silica with Nylon 66 powder prior to molding while the right hand sample was molded from Nylon 66 without the addition of silica. Both samples were exposed to the flame of a plasma torch, the stabilized (lefthand) sample for 15½ seconds, and the unstabilized (right hand) sample for 22 seconds. The frothy material noted in FIGURE 2 on the unstabiized sample resulted from molten nylon being pushed outwardly from the pyrolyzing surfaces by the decomposition gases. On the other hand, as is clear from FIGURE 2, the stabilized sample pyrolyzed at the surface of the nylon and showed no evidence of liquid egression to the surface for the surface consisted of silica particles only.

Such stabilized thermoplastic hydrocarbon resins, however, can most advantageously be utilized by formulating them into composite ablating heat shields. Where the heat shield must retain its shape for aerodynamic reasons the stabilized resin is most advantageously used as an impregnant for ceramics. The ceramics should have a high percentage of porosity and be composed of interconnected cells of relatively large size; for instance, of an average cell size of it least 250 microns. Such cells are small enough to obtain advantages of heat dissipation through diffusion of the pyrolysis gases through the pores to the boundary layer between the heat shield and the surrounding media while pores of a smaller size create impregnation problems. Suitable highly porous ceramics are disclosed in the copending United States application Ser. No. 17,691, filed Mar. 25, 1960, in the name of Eric L. Strauss, an inventor in the instant application, now abandoned, and will be discussed later. These ceramic materials have a volume of pores in excess of the volume of the continuous ceramic phase, and should have a volume at least two times the volume of the continuous ceramic phase.

In most instances, however, the stabilized thermoplastics are most advantageously formulated into a heat shield by mixing them with thermosetting resins forming a char upon pyrolysis such as phenol-aldehyde resins. Thermosetting resins characteristically form a char upon pyrolysis. The composite heat shield may be formed, for example, by mixing finely divided solid particles of the thermoplastic resin containing a suitable amount of the stabilizing agent with finely divided particles of the thermoset resin in its intermediate fusible stage and then fluidizing both resins and molding them to a desired shape or onto structural support or the like while simultaneously converting the thermoset resin into its final infusible stage. On the other hand, the two resins may be dissolved in a mutual solvent, mixed with a suitable amount of a stabilizing agent, and cast or molded into a desired shape; or, the dissolved resin mixture may be sprayed onto a supporting body, in a plurality of layers if necessary, until a heat shield of adequate thickness is built up; or the mixture may be formed into a paste and troweled onto a supporting surface to form a heat shield of desired thickness.

Figure 3:
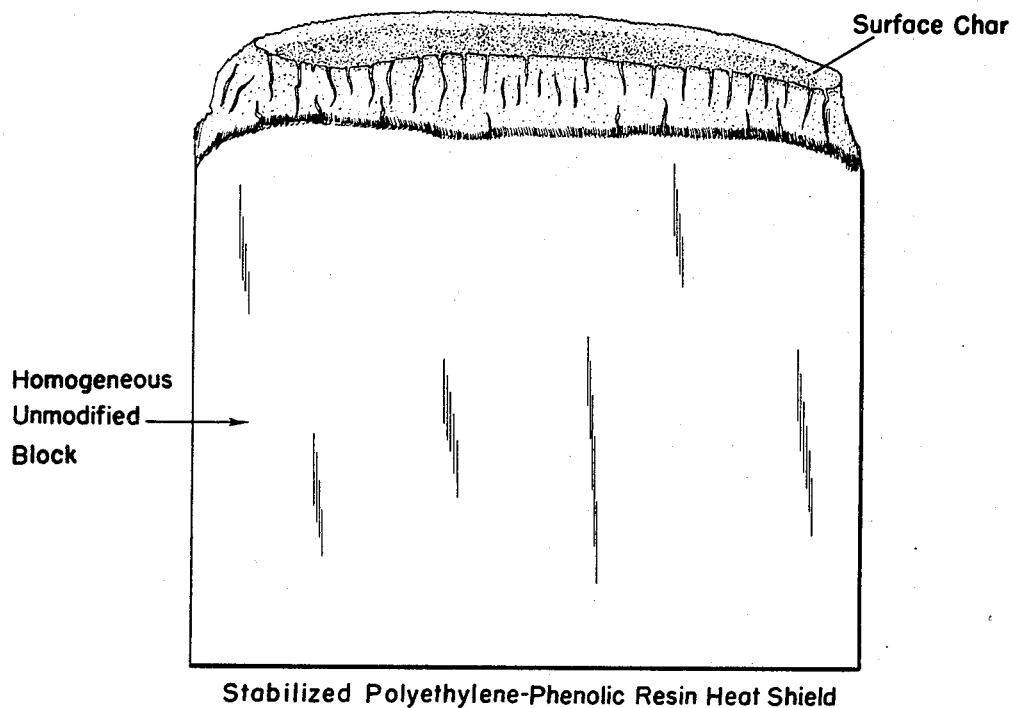
FIGURE 3 illustrates the effect of ablating temperatures, in simulated re-entry tests, on a composite heat shield formed from a phenol-formaldehyde resin and a polyolefin resin stabilized with silica.

FIGURES 3 and 5 illustrate the results of simulated re-entry tests with typical composite heat shield of the type discussed above, especially when using resins having a high content of hydrogen. In all instances, the migration of the stabilized thermoplastic was suppressed until thermal decomposition occurred.

The molded composite heat shield article used for the test results shown in FIGURE 3 was formed from a mixture of 10 parts by weight of a moldable phenol-formaldehyde powder in its intermediate fusible phase, 9 parts by weight of a powdered low density polyethylene resin of a medium melt index composed principally of particles between 75 and 300 microns in diameter (commercially available as Microthene) and 1 part of a finely divided porous non-crystalline silica available under the tradename of Syloid 244 and mentioned above. The mixture was dry-blended and then compression molded at 290 p.s.i. and at a temperature of 300° F. to form a molded block with a 2½ in. diameter x 3¾ in. thick. After subjecting the molded article to a plasma arc for 6 minutes at 125 B.t.u./ft.²-sec. the sample showed a consistent fine grained surface char and a homogeneous appearance below the char line as is clearly shown in FIGURE 3.

In the phenolic-polyethylene heat shield set out above, the phenolic resin decomposes to yield approximately 50% by weight of char and 50% of gaseous products while the polyethylene gasifies almost completely. In this way, the char forms a very refractory, low conductivity layer ahead of the undecomposed plastic. It has a high surface emittance and can attain a high surface temperature; consequently, a large percentage of the incoming heat is re-radiated. The char is consumed by oxidation and eroded by aerodynamic shear forces. Such ablators are effective over a wide range of heating rates ($10^1$ to $10^3$ B.t.u./ft.$^2$. sec.) since the char will not decompose (except by oxidation) until the sublimation temperature of carbon is reached (approx. 7000° F.).

The chart of FIGURE 4 graphically illustrates the efficiency of stabilized ablating heat shields compounded with the constituents and in the manner set out in the preceding paragraph in comparison with ablating heat shields molded from equal parts by weight of a phenol formaldehyde resin and nylon. In the two sets of comparisons shown, the criterion used was the weight of the two types of heat shields required to limit the back wall temperature to the indicated temperatures when all of the ablating heat shields were subjected to heating for 11 minutes with a plasma arc respectively at 50 B.t.u./ft.$^2$-sec. in the first set of comparisons and at 25 B.t.u./ft.$^2$-sec. in the second set of comparisons. The results shown in the chart demonstrates clearly that the stabilized polyethylene-phenolic resin ablator is importantly superior to the unstabilized nylon-phenolic resin ablator since at all back wall temperatures much less polyethylene-phenolic resin is required than nylon-phenolic resin. The differences are especially large at relatively low back wall temperatures. Weight of material required to achieve a desired function, as is known, is a primary consideration in space technology.

Where a phenolic resin is used as the thermoset resin, the proportions of thermoplastic to thermosetting resin should range from 40% thermoplastic including colloidal silica and 60% thermosetting resin to 60% thermoplastic, including silica, and 40% thermosetting resin by weight. Limiting factors are sufficient thermosetting resin to form a stable char and maintain the required, or desired, degree of structural integrity while retaining in the mixture as much of the light weight, gas producing thermoplastic component as is practical. In general, the relative proportions of thermoset resin to thermoplastic resin, including the stabilizing agent, respectively may vary between 30:70% and 80:20%; i.e., 30–80% thermoset to 70–20% thermoplastic, including the stabilizing agent.

FIGURE 5 illustrates the cross-section of a 1 inch thick open-cell highly porous Zirconia foam block (having a porosity of about 86%) which has been impregnated with a stabilized polyethylene resin and thermally exposed in the manner set out below. In the preparation of the impregnant, 9 parts of Microthene polyethylene and 1 part Syloid 244 colloidal silica (both defined above) were dry blended. Then the impregnation of the Zirconia foam with the polyethylene and silica was accomplished in the liquid phase at 300° F. and approximately 100 p.s.i. by a known compression molding operation. In this way, the Zirconia was impregnated with 0.75 g./cc. of the polyethylene. After the impregnation was accomplished and the impregnated Zirconia block had cooled, the upper surface of the block was subjected to heating for 20 minutes with an oxy-acetylene torch at 25 B.t.u./ft.$^2$-sec. The wavy black line near the bottom of the block shows the depth to which decomposition of the polyethylene occurred. No evidence of liquid migration was observable. The back wall temperature rose during the 20 minute exposure so that the final back wall temperature was 450° F. above room temperature. On the other hand, when another 1 inch sample of the same Zirconia foam was impregnated with 0.75 g./cc. of a phenol-formaldehyde resin and subjected to heating with the oxy-acetylene torch at 25 B.t.u./ft.$^2$-sec., the back wall temperature rose 450° F. after only 13 minutes of heating.

Tables 1 and 2 further summarize the advantages of the invention when composite ablative heat shields are used containing a stabilized thermoplastic resin typified by polyethylene. In Table 1, the stabilized polyethylene was that disclosed in the discussion of FIGURE 5 while in Table 2 the stabilized phenolic-polyethylene is that discussed in connection with FIGURE 3.

TABLE 1.—COMPARISON OF THERMAL PERFORMANCE OF HEAT SHIELD MATERIALS DURING SIMULATED RE-ENTRY EXPOSURES

| Test Condition | Impregnated Porous Ceramics Weight, 7 lb./ft.$^2$ | |
|---|---|---|
| | Phenol-Formaldehyde Impregnants | Stabilized Polyethylene Impregnant |
| | Elapsed Time for 450° Temperature Rise | |
| Oxy-Acetylene Torch (Zirconia Foam): | | |
| 25 B.t.u./ft.$^2$-sec | 13.0 minutes | 20.0 minutes. |
| 75 B.t.u./ft.$^2$-sec | 9.0 minutes | 10.5 minutes. |
| Oxy-Acetylene Torch (Alumina Foam): | | |
| 75 B.t.u./ft.$^2$-sec | 11.0 minutes | 13.2 minutes. |
| 75 B.t.u./ft.$^2$-sec | 7.5 minutes | 9.0 minutes. |

TABLE 2.—COMPARISON OF THERMAL PERFORMANCE OF HEAT SHIELD MATERIALS DURING SIMULATED RE-ENTRY EXPOSURES.

| Test Condition | Charring Ablator Length of Exposure, 11 Minutes | |
|---|---|---|
| | Nylon-Phenolic (50–50) | Stabilized Polyethylene-Phenolic |
| | Required Weight for 450° F. Temperature Rise | |
| Plasma Arc: | | |
| 25 B.t.u./ft.$^2$-sec | 3.6 lbs | 2.9 lbs. |
| 50 B.t.u./ft.$^2$-sec | 6.7 lbs | 4.4 lbs. |

While the preceding illustrative evaluations of the superior functioning of the ablative heat shields of this invention have been concerned with polyethylene, it is apparent that other saturated or substantially saturated hydrocarbon resins derived from ethylene and one or more other alpha olefins or from one or more other alpha olefins in the absence of ethylene would contain the same high hydrogen content and, as a result, the same or substantially the same thermal properties.

Other types of readily available finely divided (submicron) noncrystalline silica have been used to control the viscosity and stabilize thermoplastic resins which pass through a liquid phase before pyrolysis. For instance, a finely divided silica available under the trade designation of Cab-O-Sil has been used to very effectively stabilize thermoplastic resins under simulated flight conditions. Cab-O-Sil is a pyrogenic colloidal silica prepared in a hot gaseous environment and typically contains 99%, and more, of $SiO_2$, has a particle size of 0.015–0.020 micron and surface area of 175–200 m.$^2$/g.

Likewise, the finely divided silicas have been used to control the viscosity and stabilize other types of thermoplastic resin such as polystyrene, polypropylene, polycarbonates and nylons. Apart from the inherent heat shielding capacity of a thermoplastic resin upon pyrolysis, the efficiency of the resin is determined to a considerable extent by the degree to which it is pyrolyzed. In this respect polypropylene possesses excellent heat shielding properties for the reasons pointed out before and for the additional reason that it is completely pyrolyzed. Likewise, polystyrene and nylon pyrolyze with very little residue. Polystyrene, being a hydrocarbon, has the advantage of possessing a higher hydrogen content than nylon. Polycarbonates, on the other hand, leave a residue of 25–30% upon pyrolysis and in addition do not possess a very high hydrogen content.

The discoveries of this invention can be used to stabilize other thermoplastic resins used in heat shields such as vinyl resins other than polystyrene including acrylic resins, vinyl chloride, halogenated ethylenes such as poly-tetrafluoroethylene or poly-trifluorochloroethylene, various types of polyamide resins including types of nylon not set out above etc. In general, however, the introduction of atoms other than hydrogen onto the carbon atom of the monomer and the utilization of polymers containing hereteroatoms in the carbon chain introduces added features of cost without compensating advantages.

It is generally known that thermoset resins characteristically form a char upon pyrolysis and although phenolic resins are highly satisfactory from a cost and a functional viewpoint, other suitable char formers, include: melamine resins, typically derived from melamine and formaldehyde; polyester resins, typically an alkyd resin copolymerized with styrene; epoxy resins, typically the reaction product of an epi- or a dichlorohydrin with polyhydric compounds such as polyhydroxy phenols (bisphenol) or polyhydroxy aliphatic compounds (glycols), silicone resins, typically derived from dichlorodialkyl silanes and the like.

It will be understood, therefore, commercially available thermoplastic and thermoset resins may be used in the process and products of this invention.

While the heat shields do not require the presence of ingredients other than those discussed, certain additives may be introduced to decrease their weight or to add desirable physical attributes. For instance, phenolic microballoons may be added to decrease density and silica fibers may be added to increase char strength. Glass micro spheres and asbestos fibers may be added for like purposes.

In contrast with all-plastic composites which are effective over a wide range of heating rates, such as 10 to 1000 B.t.u./ft.$^2$-sec., the resin-impregnated porous ceramics can not be used over as wide a heating rate range since their surface temperature is limited by the melting point of the ceramic. If zirconia (melting point—4700° F.) is used as the ceramic matrix, heating rates to 200 B.t.u./ft.$^2$-sec. (and higher heating rates for short periods of time) can be imposed without melting the ceramic surface. During re-entry, the resinous impregnant decomposes into gaseous pyrolysis products yielding mass transfer cooling in the boundary layer and reducing heat flow from the hot outer surface to the decomposition zone by counterflow cooling. Low molecular weight gases of high specific heat provide exceptional mass transfer and counterflow cooling.

Since the ceramic will not oxidize, a resin-impregnated porous ceramic will retain its initial thickness and shape. Therefore, one of the important applications for resin-impregnated porous ceramics is in re-entry bodies which must retain their shape for aerodynamic reasons.

When using a ceramic as a matrix for stabilized thermoplastic resins, it has been found that one may experience difficulty with the mechanical stability of the matrix. For instance, when porous ceramics which have been impregnated with thermoplastics and as polyethylene, nylon, polypropylene, polystyrene, polycarbonate and methylmethacrylate are tested in an oxy-acetylene torch, the ceramics may tend to split and crack either because of swelling of the plastic or because of rapid gas formation which builds up a high internal pressure. Damage to the cellular structure may, however, be alleviated by first impregnating the ceramic with a light cell wall coating of a thermosetting resin. Phenol-formaldehyde, phenyl silane, and other silicone resins have been found suitable as cell wall coatings. In a typical application, the amount of resin used was approximately 0.15 gram per cubic centimeter of porous ceramic. This amount is controlled by adjusting the resin viscosity as required, either by the addition of solvents or by raising the resin temperature to obtain a low viscosity liquid, and allowing excess resin to drain off after water vacuum impregnation. The cell wall coating resin may be cured and post cured to 450° F. for maximum thermal stability. The cell wall coating increases crushing strength of the porous ceramic between 4 and 10 fold. Even after pyrolysis of the resin, the carbonaceous residue will adhere to and strengthen the cell walls.

Since the cell wall coating does not materially alter the open celled structure of the porous ceramic, a second impregnation can now be accomplished. This second impregnation may be a thermoplastic of the type previously mentioned. As stated, of the thermoplastic resins, polyethylene and polypropylene are the preferred impregnants because of their high hydrogen content (14.3% by weight) which imparts a high specific heat to the resin and its decomposition products. Due to the high crushing strength of the cell wall-coated porous ceramic, it has become feasible to impregnate with stabilized thermoplastics by a compression molding technique at pressures of 100 to 200 p.s.i.

While zirconia constitutes a preferred refractory ceramic matrix, other refractory ceramic materials may be used provided they have requisite high melting points (typicaly above 3000° F.), thermal stability in air, resistance to chemical attack at high temperatures experienced in space technology and sufficient porosity to function in the manner described above. Also, the density of the ceramic should be as low as possible consistent with its functioning to retain the shape of the heat shield after decomposition of the resin. Volumetrically speaking, the refractory ceramic material will have a major proportion of pores and should have a porosity of 66%, and more, and preferably a porosity of 80 to 92%. Suitable refractory ceramics may be selected from refractory oxides, carbides, silicides, borides and nitrides.

The refractory ceramic material may consist of a substantially pure substance such as zirconium oxide or a combination of substances such as silicon carbide coated with a protective layer of zirconium oxide. Since certain substances would be unsuitable for use at very high temperatures in oxidizing atmospheres, they may be protected in any suitable manner with another substance which will impart the necessary chemical resistance to the reactive subtracts. Silicon carbide which is rapidly oxidized in air above about 3200° F. may be protected with an adherent coating of zirconium oxide, for example, so as to render it resistant to oxidation at temperatures well in excess of 3200° F. The combination of silicon carbide and zirconium oxide, therefore, is a "refractory ceramic material." Many other combinations of materials are, of course, contemplated and are not limited to this example.

Exemplary high melting compounds for use as refractory materials in the present invention are:

(a) Oxides $Al_2O_3$, $Y_2O_3$, $SiO_2$, $ZrO_2$, $HfO_2$, $Cr_2O_3$, $ThO_2$.

(b) Carbides $B_4C$, SiC, TiC, ZrC, HfC, VC, NbC, TaC, MOC, WC.

(c) Silicides $TaSi_2$, $MoSi_2$, $WSi_2$.

(d) Borides $CAB_6$, $SrB_6$, $BaB_6$, $LaB_6$, $CeB_6$, $ThB_6$, $TiB_2$, $HfB_2$, $ZrB_2$, NbB, TaB, MOB, WB.

(e) Nitrides BN, ScN, TiN, ZrN, HfN, TaN, $Si_3N_4$.

Other high melting compounds are, by way of example, complex oxides like mullite $(3Al_2O_3*2SiO_2)$, zircon $(Zr)_2*SiO_2)$, spinel $(MgO*Al_2O_3)$, $SrO*ZrO_2$, $BaO*ZrO_2$, $3BeO·2ZrO_2$, $CaO·Cr_2O_3$, $2CaO·SiO_2$.

The following table gives the properties of typical highly porous ceramics successfully used in the practice of the invention.

TABLE 4.—PROPERTIES OF FOAMED CERAMICS USED IN HEAT SHIELDS

|  | SiC | $Al_2O_3$ | $ZrO_2$ | $SiO_2$ |
|---|---|---|---|---|
| Temperature Limit (° F.) | [1] 3,500 | 3,300 | 4,000 | 3,000 |
| Porosity (percent) | 90 | 88 | 86 | 84 |
| Density (g./cc.) | 0.32 | 0.52 | 0.73 | 0.34 |
| Thermal Conductivity (k) at 600° F., (B.t.u.-in./hr.-ft.$^2$-° F.) | 5.70 | 4.15 | 0.95 | 1.10 |
| $\rho k$ (B.t.u.-lb./hr.-ft.$^4$-° F.) | 9.5 | 11.2 | 3.6 | 1.9 |
| Chemical Composition (percent pure ceramic) | 96 | 97 | [2] 97 | [3] 99.8 |
| Compression Strength (p.s.i.) | 200 | 930 | 240 | 770 |

[1] When treated with zirconia to prevent oxidation.
[2] $ZrO_2$ and CaO.
[3] Fused Silica.

It will be appreciated that other high-melting oxides, carbides, nitrides and silicides which are thermally stable in air and resistive to chemical attack by air, either singly or in a suitable combination fall within the definition of refractory ceramic material.

As previously pointed out in the discussion of FIG. 5, impregnation of the ceramic may be performed in any suitable manner. Preferably the average cell size of the ceramic is about 250 microns or larger, since pores of smaller size are rather difficult to fill with liquid resin. The stabilized thermoplastic resin may be first obtained in the liquid state, so that it may be injected into the ceramic; and, subsequent to impregnation, caused to solidify in the ceramic. The resin can be obtained as a liquid either in the unpolymerized state, or by dissolving it in a suitable solvent, or by preparing it in the form of a slurry or by melting. After impregnation, the resin may be polymerized, fused or otherwise solidified in situ, any solvents or liquid carriers having been previously evaporated off. Where the impregnant is sufficiently fluid, the ceramic body may be impregnated by vacuum impregnation.

The composite heat shields of this invention containing a ceramic matrix may be fabricated into a monolithic structure or may be formed into small tiles or blocks and attached to a metal or other backing, with a suitable adhesive.

Regardless of whether the heat shields of this invention constitute monolithic structures or are formed on a backing, they should not be confused with ordinary corrosion protective or decorative coating which typically, at most, are a few mills in thickness. For instance, where the heat shield is intended to provide thermal protection for a maximum of 30 seconds the ablative heat shield required would be at least 1/16″. Where protection is to take place over an appreciable period of time, the heat shield would be 1/2″, or more, thick and in many applications the heat shield would have to be 1″ or more in thickness. In most instances, heat shields in excess of 1 1/2″ in thickness are not required.

In most instances, the primary function of a heat shield is to protect and thermally insulate the underlying structure. The weight of shielding required to protect the vehicle structure during re-entry is one of the governing factors in selecting the heat shield material. Consequently, the emphasis often is on heat shield materials of low density which on an equal weight basis (lb. of weight per square foot of surface area) provide a thicker heat shield and lower heat conductance than heavier heat shield materials. If density is reduced by the introduction of voids or porosity, strength is also decreased. Consequently, the density of heat shield materials can not be reduced beyond the point where the material displays inadequate structural properties. The use of inherent low density plastics such as polypropylene (0.91 g./cc.) is therefore very advantageous.

In addition to the use of the polyethylene-phenolic-colloidal silica composite as an ablative heat shield material, it may be used as a so-called ablative coatings (1/16 inch thick) to protect metal structures for short time heating periods such as might occur during firing of a missile from a silo (flash back from exhaust gases) or during ascent through the earth's atmosphere. Such a thick coating, of course, may be considered a heat shield.

A typical formulation for such a coating consists of 2 parts epoxy resin, 1 part of a thermoset urethane resin and one part polypropylene with colloidal silica plus the appropriate catalysts for the epoxy and urethane resins. The polypropylene is dissolved in toluene and added to the mixture of liquid resins. The ablative coatings are cured at 170° to 210° F.

When heated with a propane land torch, and uncoated piece of 0.063 inch thick aluminum will melt through after approximately 10 to 15 seconds. The metal back of a coated sample (0.063 inch thick aluminum and 0.063 inch thick coating) will reach a temperature of approximately 500° F. after one minute of continuous heating without melting.

The foregoing discussion makes it apparent that many variations may be made in the illustrative details of this invention without departing from the spirit of the invention or the scope thereof as defined in the appended claims.

We claim:

1. A composite ablating heat shield comprising a porous ceramic material having a porosity of at least 67% by volume having the walls of the pores coated with a thermoset resin and having its pores impregnated with a thermoplastic resin stabilized with about 5 to 20% by weight based upon the thermoplastic resin of finely divided colloidal silica.

2. The heat shield of claim 1 in which the ceramic melts at a temperature of at least 3000° F. and is thermally stable in air.

3. The heat shield of claim 1 in which the thermoplastic resin is an olefin resin.

4. A process for providing ablative protection for a structural body normally subjected to ablative temperatures which comprises providing as an element of said body a heat shield body having a thickness of at least one-sixteenth of an inch comprising a thermoset resin and a thermoplastic resin containing about 5 to 20% by weight of a finely divided colloidal silica.

5. The process of claim 4 wherein said thermoset resin is an epoxy resin.

6. The process of claim 4 wherein said thermoset resin is a silicone resin.

7. The process of claim 4 wherein said thermoset resin is a phenyl-silane resin.

8. The process of claim 4 wherein said thermoplastic resin is a normally solid polymer of an alpha olefin resin containing about two hydrogen atoms per carbon atom.

9. The process of claim 4 wherein the heat shield body thereof contains a porous filler having a lesser density than the resins contained therein.

10. The process of claim 4 wherein the heat shield body thereof contains a fibrous ceramic material.

11. The process of claim 4 wherein the heat shield body thereof contains a resin content of about 40 to 60% by weight of a phenol-formaldehyde resin per about 60 to 40% by weight of a thermoplastic resin.

12. The process of claim 4 wherein the thermoplastic and thermoset resin content of said heat shield body is carried in a refractory matrix.

References Cited

UNITED STATES PATENTS

| | | | |
|---|---|---|---|
| 2,855,329 | 10/1958 | Morton. | |
| 2,835,107 | 5/1958 | Ward | 260—38 |
| 2,874,139 | 2/1959 | Symons | 260—37 |
| 2,971,615 | 2/1961 | Ryznar. | |
| 3,022,190 | 2/1962 | Feldman | 260—37 |
| 3,055,831 | 9/1962 | Barnett et al. | 260—38 |

OTHER REFERENCES

Butz "Aviation Week," Sept. 7, 1959, reprinted by General Electric, PIB-36 (11–59), 6 pp.

Zaehringer et al.: "Missiles and Rockets," vol. III, No. 3, March 1958, pp. 69, 73 and 74.

Gruntfest, Chemical Engineering, vol. 66, June 1959, TN 1 M45, pp. 134, 136 and 138 are cited.

Gruntfest et al.: Modern Plastics, vol. 35, June 1958, TP986 A1M6, pp. 155, 156, 158, 235 are cited.

ALLAN LIEBERMAN, *Primary Examiner.*

J. E. CALLAGHAN, *Assistant Examiner.*